United States Patent [19]
Lazorchak

[11] Patent Number: 5,577,578
[45] Date of Patent: Nov. 26, 1996

[54] ENERGY EFFICIENT MOTOR BRAKE

[75] Inventor: Edward Lazorchak, Mahwah, N.J.

[73] Assignee: Electroid, Springfield, N.J.

[21] Appl. No.: 494,332

[22] Filed: Jun. 26, 1995

[51] Int. Cl.⁶ .................................................. B60T 13/04
[52] U.S. Cl. .......................................... 188/171; 188/164
[58] Field of Search .................................. 188/163, 164, 188/72.3, 158, 161, 171; 192/84 R; 310/36, 92, 105

[56] References Cited

U.S. PATENT DOCUMENTS

| | | | |
|---|---|---|---|
| 2,421,757 | 6/1947 | Oetzel | 188/164 |
| 3,730,317 | 5/1973 | Jaeschke | 188/164 |
| 4,966,255 | 10/1990 | Fossum | 188/171 |
| 5,185,542 | 2/1993 | Lazorchak | 310/105 |
| 5,186,286 | 2/1993 | Lindberg | 188/171 |

Primary Examiner—Douglas C. Butler
Attorney, Agent, or Firm—Anthony D. Cipollone, Esq.

[57] ABSTRACT

A pulsed brake drive for an electro-magnetic brake incorporating a permanent magnet which can be pulsed into either an on or off stable state wherein the brake is driven by a very short pulse depending on brake voltage. In the event of a failure of any one phase of the line the drive shuts off the motor and applies the brake. Further, if the power supply to the motor is off, the brake, which is normally on, can be released and then re-applied by a pushbutton. Power to drive the brake is battery supplied which in turn is kept fully charged at all times from main AC power. It is this unique circuitry and combination which introduces an energy efficient motor brake driven by a short pulse-not dependent on continuous voltage.

7 Claims, 3 Drawing Sheets

ENERGY EFFICIENT MOTOR BRAKE

BACKGROUND OF THE INVENTION

1. Field of the Invention

The present invention generally involves the field of technology pertaining to an energy efficient motor brake wherein constant power to a brake is kept off and wherein the electrical circuit pulses the brake to keep the brake unlocked. Batteries, constantly charged with very low voltage, from the main AC power supply, supplies the power drive to brake. A power pulse to the brake immediately activates the brake.

The electrical circuit comprises three phases of electrical power, a transformer, rectifier and monitors. In the event of a failure of any one of the three phases of electrical power for a maximum period of twenty five milliseconds the monitors activate a circuit which in turn locks the brake.

In general, the bi-stable motor brake itself comprises a front flange, a pressure plate operatively associated with and attached to the front flange by means of plurality of fasteners such as cap screws, split lock washers and flat washers, an armature plate parallel to and spaced apart from the flange and pressure plate, a friction assembly operatively associated with and disposed between the armature and pressure plate, a field coil assembly apart from and parallel to the armature plate. A plurality of fasteners such as a combination of studs and hex nuts extend through and hold together the pressure plate, armature plate and permanent magnet field coil assembly.

Coil springs surround the studs and are disposed between the armature plate and field coil assembly.

A cover enclosed all the operative parts previously described and is attached to the flange by any well known fastening device.

The armature plate moves axially responsive to an electrical pulse to lock the brake. The coil springs bear on the armature plate supplying the force to actually move the plate in a "brake-on" position.

When the electrical circuit is off, the coil is de-magnetized and the coil spring expands and compresses the armature plate against the friction assembly in a "brake-on" position.

When the field coil assembly is pulsed with a reverse polarity, the armature plate compresses the coil springs and the permanent magnet holds the armature plate away from the friction plate and the field coil assembly releasing the brake.

2. Description of Prior Art

U.S. Pat. No. 5,185,542 relates to an electromagnetic brake which will latch and hold in either the on or off position when pulsed with a D.C. current.

U.S. Pat. No. 2,421,757 discloses friction devices comprising relatively rotatable faces engaged electromagnetically.

U.S. Pat. No. 3,730,317 disclosed a magnetic coupling wherein one of the coupling members is formed of a readily magnetized material to different polarities to effectuate movement of the coupling members between engaged and disengaged positions.

SUMMARY OF THE INVENTION

According to the present invention there has been developed and disclosed herein a drive for an electromagnetic brake comprising a permanent magnet which can be pulsed into one of two stable states; either on or off.

Depending upon brake voltage the brake is driven by a short pulse generally in the range of 30–100 ms. If any one phase of the three phases fails the drive will shut off the motor and the brake is applied. When the brake is on the power to the motor is off but by manually releasing the brake, by means of a push button switch, the brake may be released. A battery, kept fully charged at all times by means of AC power, supplies the principal power to drive the brake.

Three transformers are connected across a three phase input line in a delta configuration and one of such transformers always sees full line voltage while the other two are connected as shown in the drawings and which will be more fully described below. Obviously, when the motor starter coil is energized the other two transformers will be connected across full line voltage. However, when the motor starter coil is not so energized the other two transformers will be connected in series and the output voltage of these two will equal one-half of the output voltage of the first.

Connected across the secondaries of each transformers are bridge rectifiers and a full wave rectified voltage will be impressed across the plus and minus or positive and negative terminals of the bridges. Each bridge rectifier output in turn is connected to a filter capacitor through a diode and the input of a voltage regulator. Further, the outputs are also connected to voltage monitoring circuits each comprising a pair of resistors and a filter capacitor. In turn, the voltage monitoring circuit outputs are connected to diodes such that when the voltage at the cathodes of the diodes fall below a present limit or floor, contacts open, and the brake is applied as will be more fully described below.

The voltage at the cathode of one of the diodes falls below the predetermined or present limit or floor when the starter is in the off position, as well as the voltage at the anode of the associated diode. The voltage at the base of Q1 will drop to ground and the transistor will therefore not conduct. The voltage across the coil will be zero and the contact will be open. The voltage at the collector of Q1 will be approximately the same as the battery voltage.

When a brake-on pushbutton is pressed, assuming a previous off position, a transistor will conduct and the base drive of Q12 will fall below drive voltage since the voltage at the Q1 collector is seen at the top of the brake on pushbutton. The voltage at the collector will rise to supply voltage and a capacitor is discharged to approximately zero volts through diodes. A slowly rising waveform is applied to the base of Q13 and when it reaches a level to cause Q13 to conduct their conduction through Q14 will be cut off and Q12 will again conduct current and thereby this collector's voltage will be ground level and Q10 will begin to conduct and a slowly falling waveform will be applied to the base of Q11 and Q12 will cut off when Q11 goes into conduction.

When the motor is to be started push button 2 is pressed, the collector of Q1 is pulled to ground and voltage is applied to a coil and the starter coil of the motor is thus energized. The starter will be in a constant energized state since the closing of the starter coil will yield full output voltage from the transformers and the voltages at the cathodes will rise to above the threshold level set by a zener diode.

At this same time, the voltage at an anode will fall to within one volt of ground level and a pulse will be applied to the gates of Q5 and Q6 and current will now flow from the power source through Q7, the brake coil, Q5 and Q6 to ground, and the brake is now released.

To indicate the state of the brake, that is on or off, an indicator, pulse driven, is connected across the brake coil.

Since the indicator requires a longer pulse drive than the brake it ensures that the brake has been supplied with a pulse of sufficient duration to effect a change in the state of the brake.

When the collector of Q1 is at a low level, pressing push button 4 will have no affect and the brake cannot be applied. To stop the motor, push button 1 is pressed, Q1 goes out of conduction, the contacts are released, and the brake is applied.

The voltage developed across a filter capacitor is regulated by a regulator semiconductor and by adjusting the output voltage of this regulator the voltage across which the battery is kept charged can be adjusted to an optimum level.

It is therefore an object of the invention to provide an energy efficient brake motor.

It is another object of the invention to provide a brake driven by a short pulse not dependent on continuous voltage.

It is a further object of the invention to provide a motor brake wherein if one phase of the line fails the drive will shut off the motor and apply the brake.

It is still a further object of the invention to provide a brake whereby if motor power is off the brake is normally on but can be released and re-applied by using pushbuttons.

It is yet a further object of the invention to provide a brake wherein the main power to drive the brake is supplied by a battery which in turn is kept fully charged at all times by AC power.

These and further objects, features and advantages of the invention shall become apparent from the following detailed description of a preferred embodiment thereof when taken in conjunction with the drawings wherein like reference characters refer to corresponding parts in the several views.

DETAILED DESCRIPTION OF THE PREFERRED EMBODIMENT

Figure 1:
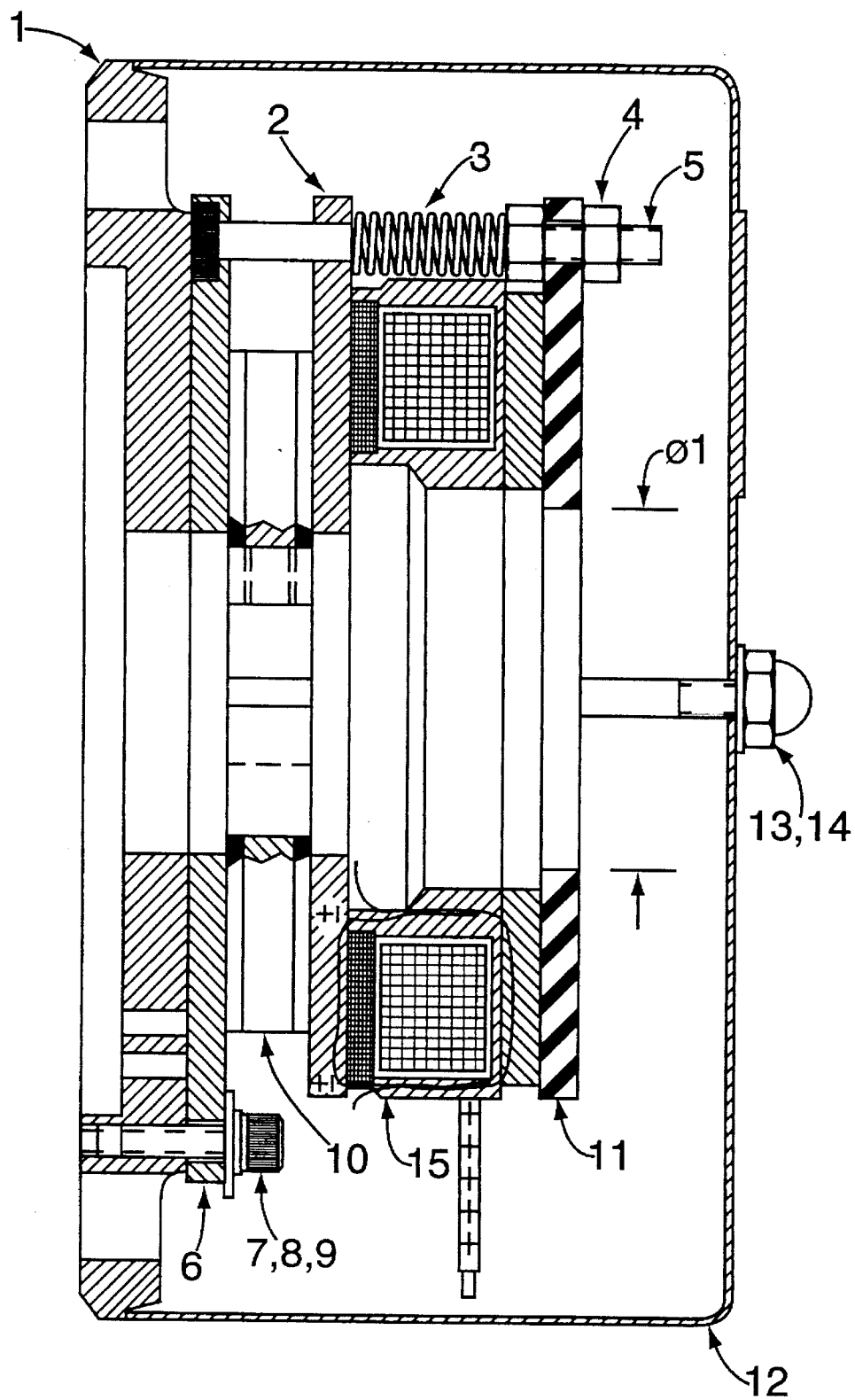
FIG. 1 is an axially cross sectional view of the bi-stable motor brake showing the various cooperating parts.

The braking element of the present disclosure is shown generally at 10 of FIG. 1 and essentially comprises a generally annular front flange 11, a pressure plate 6 operatively associated with and attached to the front flange 11 by means of a plurality of fastners such as threaded screws, threaded studs & hex nuts shown collectively at 4 & 5. An armature plate 2 is disposed parallel to and spaced apart from front flange 11 and pressure plate 6. A friction assembly 10 is operatively associated with and disposed between the armature plate 2 and pressure plate 6 and a friction material plate 10 is spaced apart from and parallel to armature plate 2 and, a permanent magnet field coil assembly shown as 15 is disposed between the armature plate 2 and front flange 11. All of the foregoing items are attached into a functioning and working relationship by a plurality of well known fastening devices such as the combination of threaded screws, threaded studs and hex nuts shown collectively as 4 & 5 which extend through and hold together the pressure plate 6, armature plate 2, permanent magnet 15 and friction material plate 10.

Coil springs 3 surround the studs 5 and are disposed between the armature plate 2 and from flange 11. A cover 12 encloses all the foregoing operative parts previously described and is attached to the motor flange 1 by any well known fastening device 13 and 14.

In operation, the armature plate 2 moves axially responsive to an electrical pulse to lock the friction material plate 10 and the coil spring 3 bears on the armature plate 2 supplying the force to actually move the plate.

When the electrical circuit is off, the coil is demagnetized and the coil spring expands & compresses the armature plate 2 against the friction material assembly plate 10 in a "brake-on" position.

When the field coil assembly 15 is pulsed with a reverse polarity, the armature plate 2 compresses the coil springs 3 and the permanent magnet 15 holds the armature plate 2 away from the friction plate 10 and the field coil assembly 15 releasing the brake.

Figure 2:
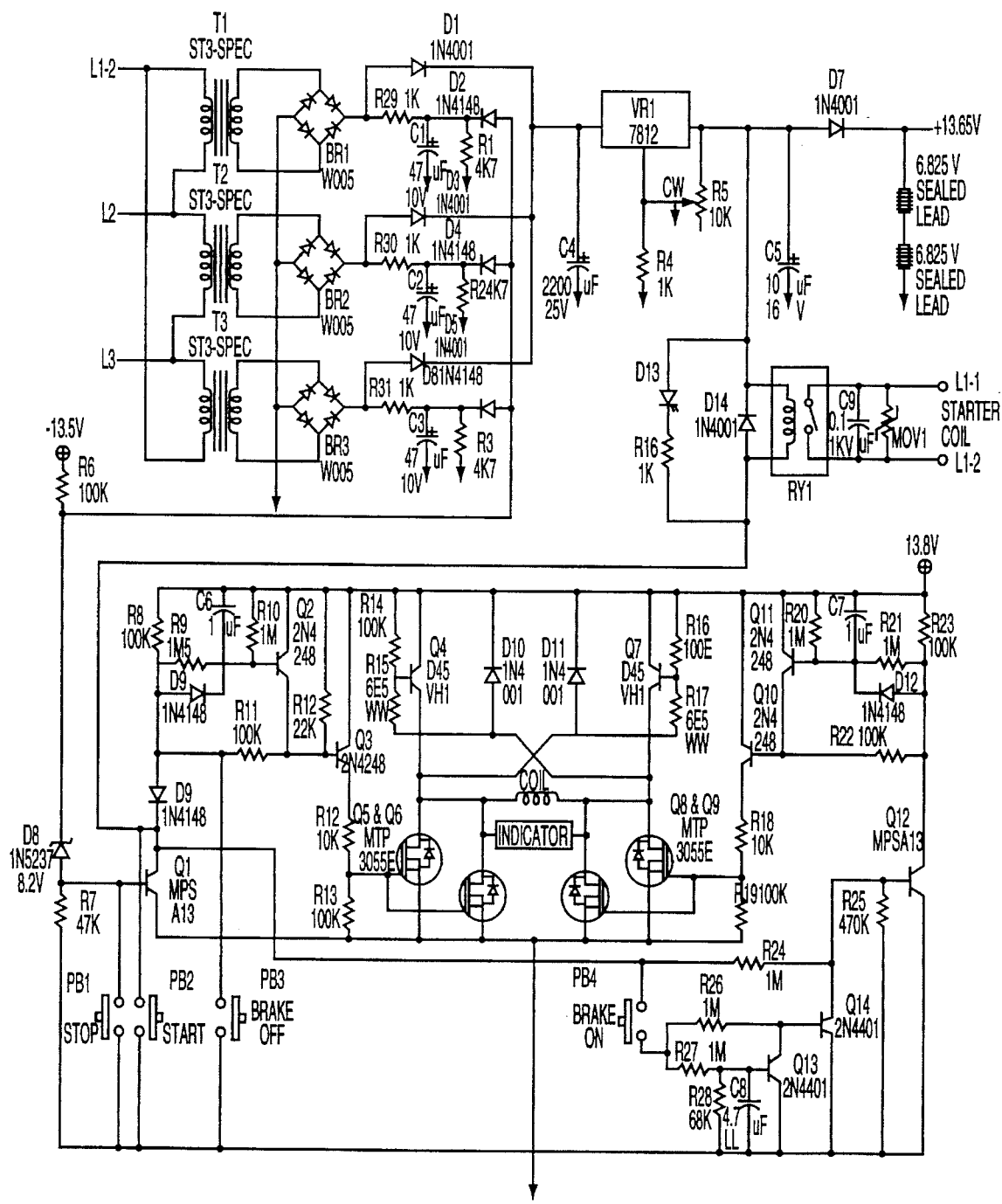
FIG. 2 is an electrical schematic of the pulse drive of the invention.
Figure 3:
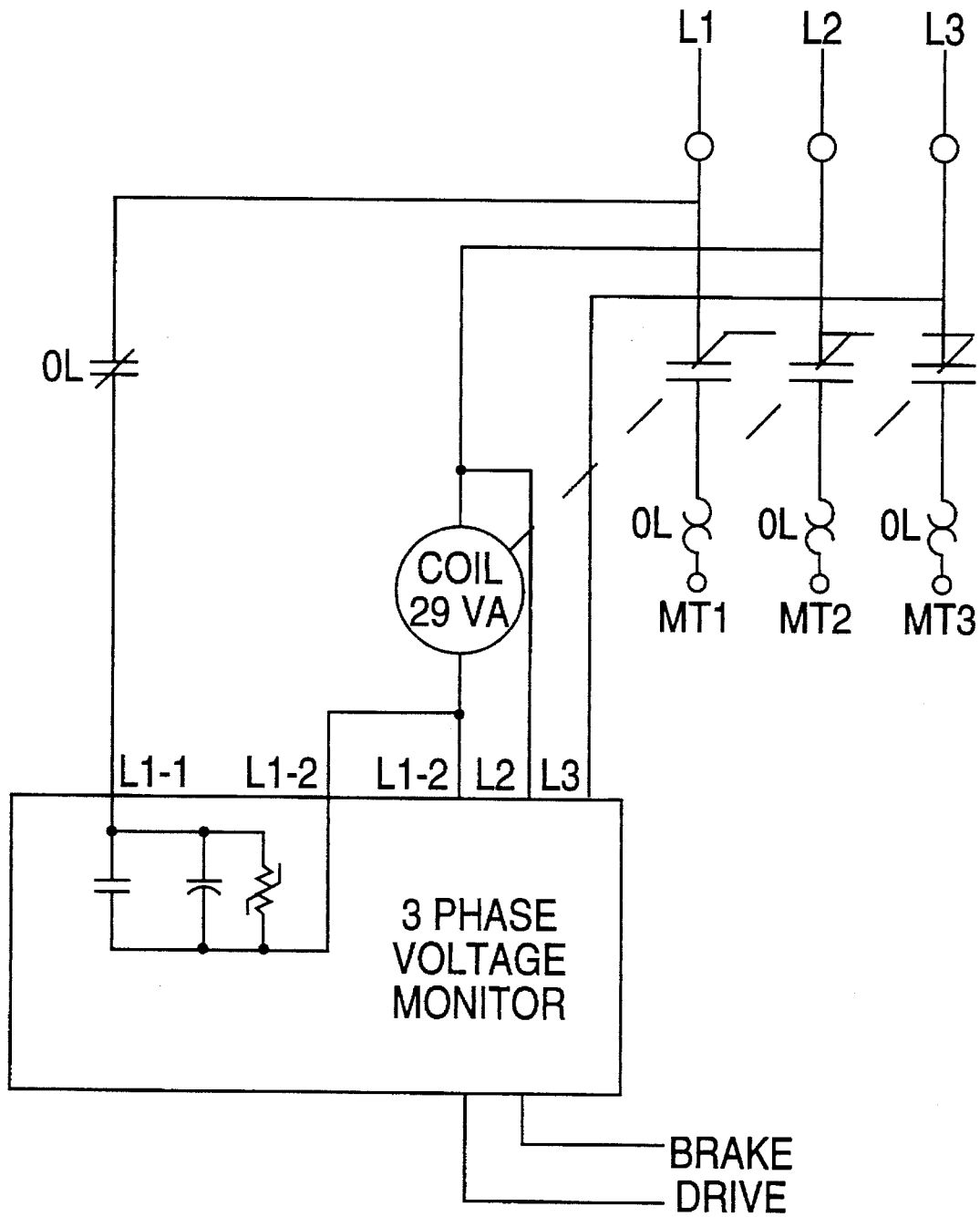
FIG. 3 is an electrical schematic of the starter wiring for the three phase line monitor and brake drive of the instant invention.

Turning now to FIGS. 2 and 3 there are shown three transformers T1, T2, and T3 connected across three phase input lines L1, L2 and L3 in a delta configuration. One of the transformers is connected such that it always sees full line voltage and the other two are connected as shown in FIG. 2. When the starter coil of the motor is energized through the contacts of RY1 the other two transformers will each be connected across full line voltage. However, when the starter coil is not energized the other two transformers will be connected in series across that transformer which is always connected across full line voltage and the output voltage of these two transformers will be half the output voltage of the other transformer.

Bridge rectifiers BR1, BR2 and BR3 are connected across the secondaries of each of the three transformers T1, T2, and T3 and a full wave rectified voltage will appear across the positive and negative or plus and minus terminals of these bridges. The outputs of each of BR1, BR2 and BR3 are connected through first rectifier diodes D1, D3 and D5 to a filter capacitor C4 and to the input of a voltage monitoring circuits comprising two resistors and a filter capacitor shown as the combination of R1, C1 and R29; R2, C2 and R30 and, R3, C3 and R31. Further, the outputs of the voltage monitoring circuits are connected to the cathodes of second diodes D2, D4 and D6. When the voltage at the cathode of diodes D2, D4, and D6 falls below a predetermined limit, the contacts of RY1 open, the motor starter contacts open, and the brake is applied as described above.

With the starter in the off position the voltage at the cathode of one of the three diodes D2, D4 and D6 falls to lower than a predetermined limit as does the voltage to a zener diode shown as D8. The voltage at the base of the Q1 transistor will drop to ground and therefore the transistor will not conduct and the voltage across the coil of previously indicated RY1 will essentially be zero and the contact will be open. The voltage at the collector of Q1 will be near battery voltage and there will be no voltage developed across the LED indicator and D13 will be dark.

The brake on push button is shown at PB4 in FIG. 2. The voltage at the Q1 collector is the voltage at the top end of this pushbutton. When the button is pressed, and assuming the brake has been set previously to the off position, transistor Q14 will be driven into conductor and the base drive to transistor Q13 will fall below drive voltage. The voltage at the collector of Q12 rises to near the supply voltage and capacitor C7 is discharged to near zero volts through diode D12 and resistor 23.

At this time, a slowly rising waveform is applied to the base of transistor Q13 which is controlled by a time constant determined by the values of resistors R27 and R28 and capacitor C8. When the waveform reaches a level sufficient to cause transistor Q13 to conduct, then conduction through transistor Q14 will be cut off and transistor Q12 will conduct current thereby causing its collector voltage to drop to near ground level. At this time transistor Q10 will start to conduct and a slowly falling waveform whose time constant is a function of the values of resistors R20, R21 and capacitor C7 will be applied to the base of resistor Q11. When transistor Q11 goes into conduction Q12 will be cut off.

The above described operation of a pulse generator which is responsive to a DC level and not to an applied trigger pulse makes the circuit invulnerable to spikes or noise.

The pulse developed at the collector of transistor Q10 is applied to the gate of power MOSFET's Q8 and Q9. At the drain of these devices, which now exhibit a low resistance to ground, the voltage will fall to near ground. This voltage is applied through resistor R15 to the base of a PNP Power Transistor Q4 and current will flow through transistor Q4, the brake coil indicated above, and then through transistors Q8 and Q9 to ground.

The voltage developed across the brake coil is in a range of 10.5–12.00 volts depending on the coil resistance and the brake will be applied.

To start the motor, push button PB2 is pressed which pulls the collector of transistor Q1 to ground and applying voltage to coil RY1. The contact of coil RY1 will close and the starter coil of the motor will be energized. The closing of the starter coil will yield full output voltage from transformers T1, T2 and T3 and the voltage at the cathodes of the diodes D2, D4 and D6 will rise to above the threshold level set by zener diode D8. Transistor Q1 will then be driven into conduction and the starter will be maintained in an energized state.

When push button PB2 is pressed, the voltage at the anode of diode D9 will fall to within 1 volt of ground level and a pulse formed by the pulse generating circuit comprising resistor R9, capacitor C6, resistor R10, transistor Q2 and transistor Q3 will be applied to the gates of transistors Q5 and Q6 and current will not flow from the battery through transistor Q7, the brake coil, transistors Q5 and Q6 to ground and the brake is now released.

A pulse driven indicator is connected across the brake coil to indicate the state of the brake, on or off.

When the collector of transistor Q1 is at a low level, pressing push button PB will have no effect and the brake cannot be applied.

To stop the motor, push button PB1 is pressed which causes transistor Q1 to out of conduction thereby releasing the contacts of RY1 thereby applying the brake as previously described.

Voltage developed across filter capacitor C4 is regulated by voltage regulator by voltage regulator VR1 a 12 V regulator semiconductor. By adjusting the output voltage of this regulator using resistors R4 and R5, the voltage across which the battery is kept charged can be adjusted to an optimum level.

Though the invention has been described and illustrated with reference to a preferred embodiment thereof, those skilled in the art will appreciate that various changes and modifications in shape, size, composition and arrangement of parts may be resorted to without departing from the spirit of the invention or scope of the subjoined claims.

What is claimed is:

1. A drive for an electro-magnetic brake which includes a permanent magnet which can be pulsed in either an "on" or "off" state comprising:

(a) a plurality of transformers connected across a plurality of phase input lines in a delta configuration;

(b) a starter coil of a motor drive;

(c) means for energizing said starter coil of said motor drive;

(d) bridge rectifiers connected across secondaries of each of said plurality of transformers wherein a full wave rectified voltage appears across the plus and minus terminals of said bridge rectifiers producing an output;

(e) first rectifier diodes connected to each said output of said bridge rectifiers;

(f) a filter capacitor connected to said output of said bridge rectifiers through said rectifier diodes;

(g) said bridge rectifiers further connected to the input of a voltage regulator;

(h) a plurality of voltage monitoring circuits connected to the said output of said bridge rectifiers producing a second output;

(i) the said second output of said voltage monitoring circuits connected to cathodes of second rectifier diodes wherein when the voltage at the said cathodes said second rectifier diodes falls below a predetermined limit contacts open, motor starter contacts open and said electro-magnetic brake is applied;

(j) a start stop push button switch operatively associated with said motor drive; and (k) brake on and brake off push buttons operatively associated with said electro-magnetic brake such that when the brake is in an off position and the brake on button is pressed, a transistor will be driven into conduction and a base drive to a second transistor will fall below drive voltage.

2. The drive for an electro-magnetic brake in accordance with claim 1 wherein three transformers are connected across three phase input lines in a delta configuration.

3. The drive for an electro-magnetic brake in accordance with claim 2 wherein said voltage monitoring circuits comprise two resistors and a filter capacitor.

4. The drive for an electro-magnetic brake in accordance with claim 3 further comprising a pulse driven indicator connected across a brake coil which indicates the on-off state of said brake.

5. The drive for an electro-magnetic brake in accordance with claim 4 wherein the voltage developed across said filter capacitor is regulated by a 12 volt regulator semiconductor.

6. The drive for an electro-magnetic brake in accordance with claim 5 wherein the power to drive said brake is supplied from a battery.

7. The drive for an electro-magnetic brake in accordance with claim 6 wherein the output voltage of a regulator is adjusted by using two resistors.

* * * * *